United States Patent [19]

Wargo et al.

[11] Patent Number: 4,630,102
[45] Date of Patent: Dec. 16, 1986

[54] DIGITAL CHROMA OVERLOAD SYSTEM

[75] Inventors: Robert A. Wargo, Ringoes; Leopold A. Harwood, Bridgewater, both of N.J.

[73] Assignee: RCA Corporation, Princeton, N.J.

[21] Appl. No.: 659,452

[22] Filed: Oct. 10, 1984

[51] Int. Cl.$^4$ .............................................. H04N 9/64
[52] U.S. Cl. ........................................ 358/27; 358/36
[58] Field of Search .................... 358/27, 36, 35, 37, 358/21 R

[56] References Cited

U.S. PATENT DOCUMENTS

| | | | |
|---|---|---|---|
| 3,715,462 | 2/1973 | Krause | 358/27 X |
| 3,740,462 | 6/1973 | Harwood | 358/27 |
| 3,764,734 | 10/1973 | Srivastava et al. | 178/5.4 |
| 3,943,560 | 3/1976 | Freestone | 358/27 |
| 3,962,723 | 6/1976 | Srivastava | 358/27 |
| 3,967,313 | 6/1976 | Miyamoto | 358/27 |
| 4,054,905 | 10/1977 | Harwood et al. | 358/27 |
| 4,106,054 | 8/1978 | Tzakis | 358/27 |
| 4,106,055 | 8/1978 | Burdick et al. | 358/27 |
| 4,183,047 | 1/1980 | Kim et al. | 358/27 |
| 4,249,210 | 2/1981 | Storey et al. | 358/167 |
| 4,349,834 | 9/1982 | Tonomura et al. | 358/27 |
| 4,376,952 | 3/1983 | Troiano | 358/36 X |
| 4,447,826 | 5/1984 | Lewis, Jr. et al. | 358/27 |
| 4,539,583 | 9/1985 | Flamm et al. | 358/27 |

FOREIGN PATENT DOCUMENTS 2102651 2/1983 United Kingdom .

Primary Examiner—James J. Groody
Assistant Examiner—Michael P. Dunnam
Attorney, Agent, or Firm—E. M. Whitacre; P. J. Rasmussen; E. P. Herrmann

[57] ABSTRACT

A system for detecting overload conditions of a chrominance signal in which the chrominance signal is compared to a predetermined maximum desired amplitude value. Occurrences of the chrominance signal exceeding the predetermined amplitude are considered to be overload conditions only if the duration of the particular occurrence continues for an interval determined by the noise content of the chrominance signal. The average value of the chrominance signal over the internal is calculated to represent the overload signal.

14 Claims, 5 Drawing Figures

DIGITAL CHROMA OVERLOAD SYSTEM

This invention relates to circuitry in a digital television system for constraining the magnitude of chrominance signals within a range of values.

BACKGROUND OF THE INVENTION

The chrominance (chroma) component of conventional broadcast video signals includes, in sequential format, a synchronizing color burst reference signal followed by color image information. The amplitude of the color burst and the ratio of the amplitude of the color burst to the amplitude of the image information are generally fixed by convention. Not infrequently, the magnitude of the color burst (and the image information) of the received signal deviates from the desired level due to faulty broadcast equipment or the transmission medium, etc. To compensate for these deviations and restore the chrominance signal to nominal levels, conventional receivers include automatic chrominance control (ACC) circuits. The ACC circuits compare the burst magnitude to a preset reference and amplify or attenuate the chrominance signal to maintain the burst signal amplitude constant at the desired level.

Due to faulty ACC operation or differential color burst-image information deviations, the ACC circuit may raise the chrominance signal magnitude undesirably high. The effect of this is to reproduce images with over-saturated colors. To compensate for this latter contingency, chroma overload circuitry is provided which monitors the chrominance signal downstream from the ACC circuitry, and attenuates the chrominance signal when its magnitude exceeds a predetermined amplitude.

In conventional analog receivers, the chroma overload function may be implemented with a simple gain controlled amplifier to provide the signal attenuation and a detector and low pass filter to provide detection. The detector is biased to detect the occurrences of the chroma signal exceeding a desirable range and these detections are integrated by the low pass filter to generate a control signal which is applied to the gain controlled amplifier to appropriately reduce the chrominance signal amplitude.

In a digital television receiver the signal is quantized at regular intervals and occurs as binary numbers synchronous with a system clock. This feature allows more sophisticated averaging techniques of chroma overload occurrences. In accordance with the present invention, chroma overload averaging is made a function of both overload density and signal noise.

SUMMARY OF THE INVENTION

In the present invention chroma samples are applied to a comparator which generates a detection signal for respective samples which exceed a predetermined magnitude. Samples which exceed the predetermined magnitude are applied to an averaging circuit which forms the average over a preset number of consecutive samples.

A noise detector which integrates signal noise over a portion of the video signal determines the preset number of samples applied to the sample averaging circuit.

The overload sample averages are thereafter applied to a coefficient generating circuit for controlling a chroma signal attentuating circuit.

BRIEF DESCRIPTION OF THE DRAWINGS

FIG. 2a is a block diagram of a digital chroma overload detector embodying the present invention;

FIG. 2b is an alternative control signal generator which may be substituted for the control signal generator 35 in FIG. 2a.

DETAILED DESCRIPTION

The occurrence of chroma overloads, i.e. chroma signal exceeding a predetermined amplitude, normally corresponds with portions of the chroma signal representing images with highly saturated color. In a field or a frame period, the percentage of chroma overload will be a function of the particular image displayed. If a chroma overload condition exists, only a small portion of a frame period may contain chroma signal exceeding the desirable amplitude (overlaod), however the amplitude of the majority of the chroma signal while, not exhibiting overload, may be proportionately larger than desired. In other words whatever created the overload condition in the more highly saturated image portions of a frame period probably proportionately affects the entire chroma signal. Such a condition tends to subjectively distort the entire picture, for example producing blooming or defocusing.

For chroma overload correction, it is desirable to detect the overload values over an entire field or frame interval to generate a correction signal which is applied to, e.g. the entirety of the successive field or frame of chroma signal, and not to just the areas exhibiting overlaod conditions.

In order to correct an overloaded chroma signal, it is necessary to determine the percentage overload. This is made difficult by two factors. The first factor is electrical noise. The second factor is related to the conventional techniques of generating the chroma signal. Different colors having like saturation values are broadcast with different amplitudes In the receiver chroma signal representing equally saturated but different colors which are equally overloaded will exhibit different amplitude values. Therefore, if the chroma signal is compared against a desired maximum value, the percentage overload relative to the maximum value cannot be determined unless the color represented by the signal is known.

Regarding the second factor, it has been found to be adequate to generate a chroma control overload control signal related to the average values of all occurrences of the chroma signal exceeding one predetermined reference level.

The effect of noise is incorporated in the present overload detector by requiring that overload exists for a predetermined number of consecutive samples before an overload detection is made. This tends to reduce false overload detection due to noise in the signal. A noise detector is incorporated to measure the average noise level in a non-image portion of the chroma signal. The noise value is used to establish the number of consecutive signal samples exhibiting overload required to indicate and represent one particular overload occurrence.

Figure 1:
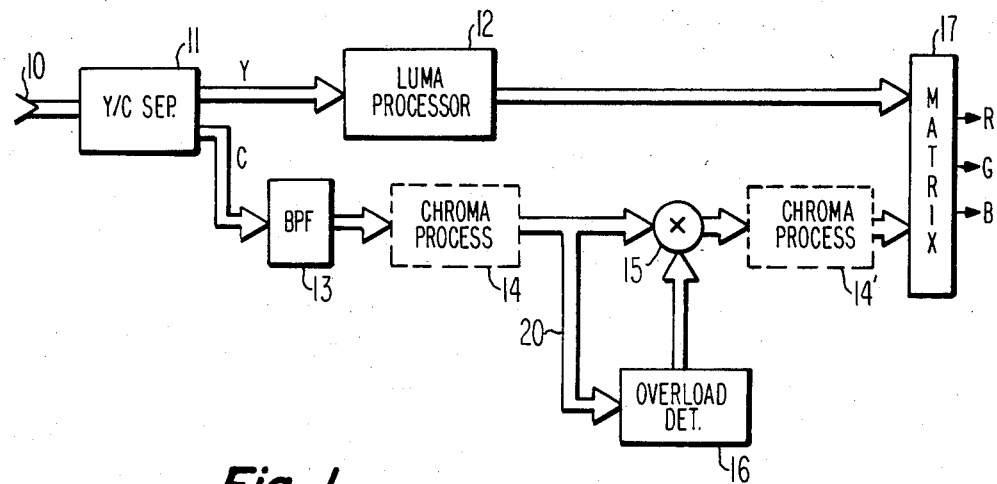
FIG. 1 is a block diagram illustrating a portion of a digital TV receiver including a chroma overload circuit.

FIG. 1 shows a chroma overload detector as applied in a digital TV receiver. In the figure, digital/binary baseband composite video signal is applied to bus 10 from e.g. an analog-to-digital converter. The digital samples are processed in the chroma/luma separation circuit 11 which separates the luminance component, Y and the chrominance component, C, from the composite video signal. The luminance component is appropriately processed in processor 12. Processed luminance signal is coupled to matrix circuitry 17 wherein it is combined with appropriately processed chrominance signal to generate RGB color signals to drive a display tube (not shown).

Chrominance signal from circuit 11 is bandpass filtered in circuit 13 to remove signal which is out of the frequency band of the chrominance signal component. The bandpass filtered chrominance signal is applied to chrominance signal processor 14 wherein it may be cored, filtered, hue corrected, etc. Processed chrominance from element 14 is applied to the chroma overload circuit consisting of an overload detector 16 and signal attenuator or amplifier 15. Signal from the overload circuit is applied to further chrominance processing circuitry 14' and then to matrix 17. Note that all chrominance signal processing may be performed in one of the elements 14 or 14', i.e. the overload circuitry may precede or succeed chroma processing.

FIG. 2a illustrates the chroma overlaod detector 16, according to the present invention, in more detail. Chrominance signal from e.g. processor 14 is applied to magnitude detector 22 via bus 20. The signal may be sequences of (R-Y) and (B-Y) color difference samples or I and Q samples. The amplitudes of these signals are sampling phase sensitive. Detector 22 derives the signal magnitude from the samples in a known manner. For example, if the sample occur at four times subcarrier rate, the magnitude of the signal may be calculated from the square root of the sum of the squares of pairs of successive samples. Depending on the architecture of the particular TV receiver, the magnitude samples may be available from chroma processor 14 obviating element 22.

The absolute values are latched in element 26. The information bandwidth of the chrominance signal is at most 1.5 MHz. To satisfy the Nyquist sampling criterion, it is necessary to sample the signal at a rate at least equal to twice the information bandwidth. The color subcarrier frequency ($f_{sc}$) is 3.58 MHz. In an overload detection circuit, however, it is not necessary to retain all of the signal information, thus, element 26 may be clocked to latch e.g. one out of four or one out of eight samples from the magnitude detector 22.

Magnitude samples from element 26 are applied to the subtrahend input port of subtracter 28 and the signal input port of gate circuit 32. A reference values, corresponding to the maximum desirable chrominance signal magnitude, from reference source 30, is applied to the minuend input port of subtracter 28.

The polarity or sign bit output signal from subtracter 28 is coupled to the control input terminal of gate circuit 32. A logic "one" occurring on the sign bit output conditions gate circuit 32 to pass the magnitude sample present on its signal input port. A logic one will occur on the sign bit output for all magnitude values from element 26 exceeding the reference value from source 30. Thus, gate circuit 32 passes only those chrominance magnitude samples exhibiting an overload condition.

Overload samples from gate circuit 32 are applied to a signal averaging circuit 34 which generates the average values of groups of N successive samples. The number, N, of samples in each group, is controlled by a signal from ROM 52, which control signal is related to the noise in the chrominance channel for the preceding field or frame.

Samples from averager 34 are coupled to the overload control signal generator 35 consisting of element 36 designated a time constant generator, a counter 38, and a ROM 42. Time constant generator 36 tends to integrate the averages from element 34 and will be described in more detail with reference to FIG. 3. For the present it is sufficient to note that time constant generator 36 has a faster attack time constant than its decay time constant.

Output samples from time constant generator 36 are applied to the address input port of ROM 42 which is programmed to produce the appropriate overload control signal for the current signal overload condition. For example, if the output signals from element 36 are designated $A_i$ and the reference value is designated B, the address locations $A_i$ of ROM 42 may be programmed to contain the values $B/A_i$.

The amplitude of overload signals is one parameter for generating overload control signals. The number of occurrences of overloads is a second parameter. Large or small number of overload detections tend to indicate the relative percentage of a field/frame that is oversaturated. In FIG. 2a, all of the occurrences of overload conditions are counted in counter 38 for a field/frame period, and the count is stored in latch 40 for use during the succeeding field/frame period. An alternative counting arrangement may configure counter 38 to increment its count only for R consecutive pulses on connection 37, indicative of blocks of continuously overloaded chrominance signal. In order to count increments of R consecutive pulses, counter 38 may consist of two cascaded counters. The first counter may be configured similar to elements 71, 72, 81 and 79 described with reference to FIG. 3 to produce a pulse only for the occurrence of R pulses on connection 37. The second counter would be arranged to count the output pulses developed by this first counter. In this instance, random overload occurrences would not contribute to the value produced by counter 38. In this latter arrangement, the size or capacity of the counter is much reduced relative to a counter which counts each overload condition.

The count value or a portion thereof, e.g. the three of four most significant bits (MSB's) of the binary number output by counter 38, are combined with the values from element 36 as address codewords to ROM 42. The bits from latch 40 may be arranged as the MSB's of the address codeword and the signal bits from element 36 arranged as the LSB's of the address codeword. The ROM 42, in this instance, will be programmed so that the count from latch 40 effectuates a scaling of overload control signal previously described. Assume as before that the reference value is B and values from element 36 are $A_i$. Let the count from latch 40 be M and equal to from 0 to 7 (three MSB's of output from counter 38). ROM 42 may be programmed to output the values $(B/A_i)/(M+1)$ for address words equal to the concatenation of M and $A_i$.

In FIG. 2a the counter 38, latch 40 and ROM 42 are strobed by a reset clock. The reset clock which may be timed coincident with the vertical sync pulse causes latch 40 to retain the count present in counter 38 at the end of a field interval and resets counter 38 to zero. The reset pulse is delayed before application to ROM 42 to allow the new address value from latch 40 to be established, and then conditions ROM 42 to output the newly addressed overload control value.

FIG. 2b is an alternative overload control signal generator 35' which forms the average value of all of the chrominance overload averages from element 34. In FIG. 2b elements designated with the same numbers as elements in FIG. 2a perform like functions. Overload average magnitudes from element 34 are applied to one input port of adder 60. The second input port of adder 60 is coupled to the output port of latch 61 which stores the preceding sum provided by adder 60. Each sample from element 34 is added to the sum of the preceding samples from element 34. The total number of samples that are summed by adder 60 is that number of overload samples occurring between reset pulses.

The total sum is stored in latch 62 under the control of the reset pulse. The total sum is then applied as dividend to divider 63.

Element 34 provides, on connection 37, a pulse for each occurrence of an overload sample. The number of samples that are summed is counted in counter 38, which number is applied to divider 63 to divide the total sum to provide the overall average. The output from divider 63 is combined with the count from element 38 (via latch 40) to form address codewords to ROM 42' which produces the overload control signal.

Referring back to FIG. 2a, samples from the magnitude detector 22 are applied to the signal input port of gate circuit 48. Circuitry 46 responsive to e.g. the vertical blanking pulse and the horizontal sync pulse generates a gating signal during the vertical blanking period. This gating signal conditions gate circuit 48 to pass samples for a duration of e.g. one horizontal line peroid. The gating signal occurs during one or more line intervals when no image, VIR, etc., information is present. The magnitudes of the samples passed by gating circuit 48 will, therefore, be indicative of the noise amplitude.

Noise samples are integrated in element 50 which may include a circuit arrangement similar to the interconnection of adder 60 and latch 61 of FIG. 2b. In such an arrangement the samples from gate circuit 48 are coupled to the first input port of the adder and at the end of the gating period the ouput from the adder represents the accumulated value of the noise samples.

The accumulated noise value over the noise integration period is indicative of the relative noise energy in the chrominance signal. It will be appreciated that the number generated by element 50 may be very large and require a large number of bits to represent the number. To alleviate hardware constraints that large total noise numbers may impose on the system it may be desirable to include only the more significant bits of the noise samples in the integration or alternatively to use only the more significant bits of the running total of the noise value.

It is not practical to develop high resolution noise control signals for overload averager 34. Rather, the noise control signal should be indicative of ranges of noise energy to provide relatively coarse adjustment of the overload averager 34. For example, the noise control signal may include only 16 different values representing 16 noise ranges. ROM 52 having an address input port coupled to the output port of noise integrater 50 is programmed to translate the integrated noise values into noise range representative control signals which are applied to overload averager 34. ROM 52 may be programmed to provide a control signal value of N=32 for the lowest range of integrated noise value of N=38 for the highest range of integrated noise values with values between 8 and 32 for intermediate ranges. (Note that noise integrater 50 is reset at the beginning of the vertical blanking interval.)

Figure 2:
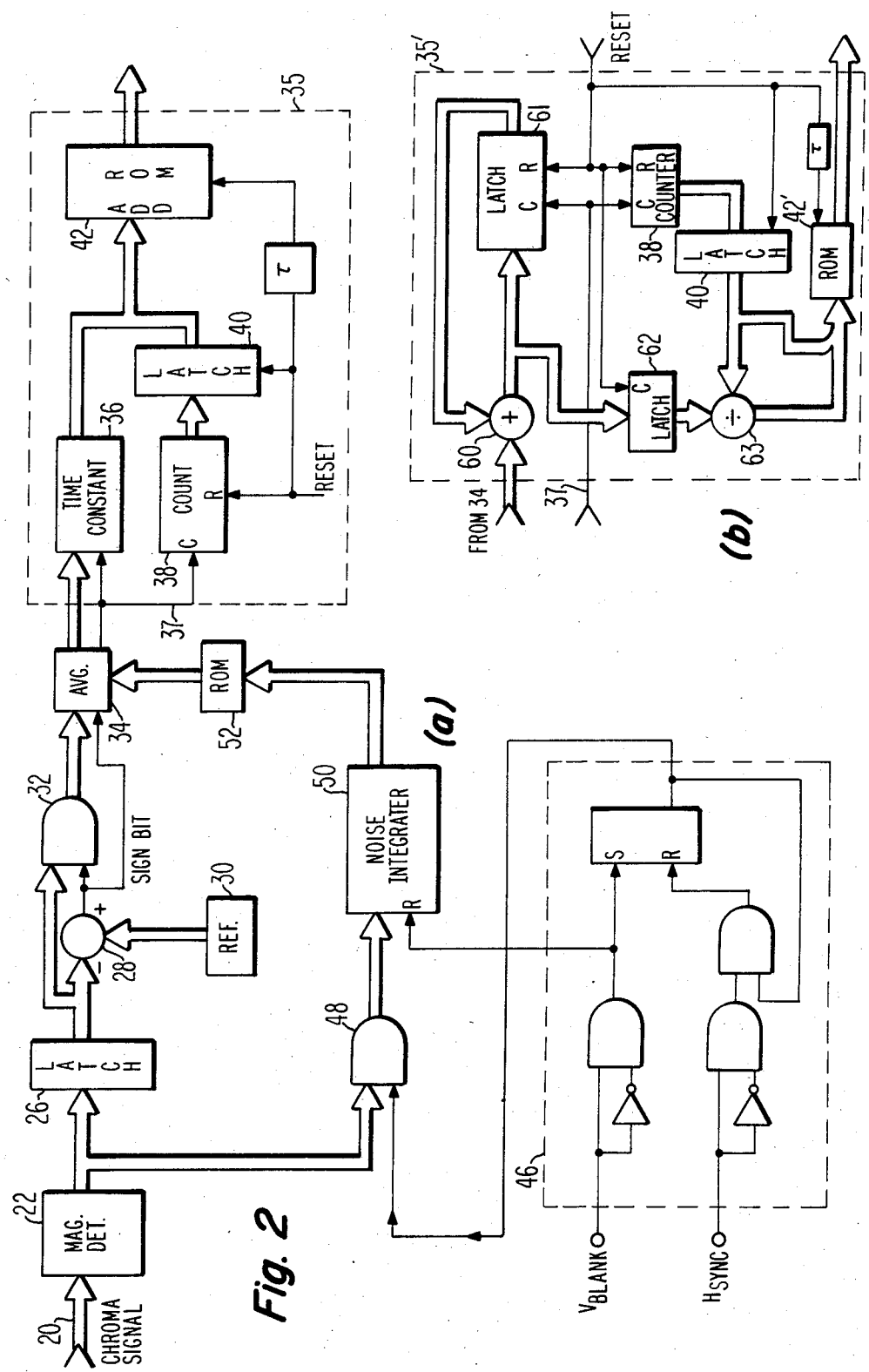
Figure 3:
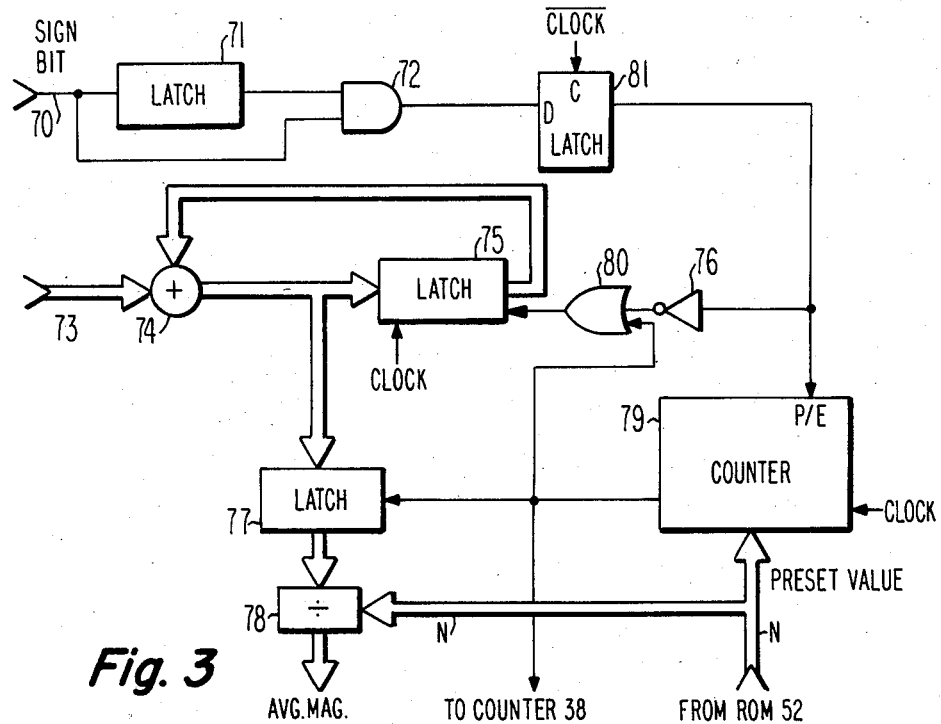
FIG. 3 is a logic diagram of a signal averager for use in the FIG. 2 circuit.

FIG. 3 shows an illustrative example of circuitry for use as element 34 in FIG. 2a. This embodiment of element 34 provides one overload output sample for N consecutive samples exhibiting an overload condition. The output sample is the average of N exclusive consecutive samples. The number N is determined by the control signal from the noise measuring elements 50 and 52.

In FIG. 3, latch 71 and AND gate 72 are arranged to indicate when an overload condition is exhibited by consecutive samples. Latch 71 provides a one sample delay period. The sign bit signal from subtracter 28 is applied to the latch 71 and one input terminal of AND gate 72. Sign bits delayed by one sample period in latch 71 are applied to a second input terminal of AND gate 72. When succesive samples exhibit the overload condition, both input terminals of AND gate 72 are at a logic high level and AND gate 72 outputs a logic high level.

The output terminal of AND gate 72 is coupled via latch 81 to the program/enable input of a programmable counter 79 and the reset input terminal of latch 75. When the output signal from AND gate 72 (and latch 81) is low, latch 75 is held in the reset condition and counter 79 is placed in the program mode, i.e. the count operation is stopped and the counter is conditioned to accept program values from ROM 52. When the output signal from AND gate 72 (and latch 81) is a logic high, latch 75 is conditioned to operate in a clocked mode and counter 79 is enabled to count clock pulses (the clock is synchronous to and equal to the sample rate provided by latch 26). Note latch 81 is interposed between AND gate 72 and elements 75 and 79 to preclude spurious resetting of these elements when the samples are clocked through the system, i.e. during those periods when the logic state of the sign bit is being determined.

Counter 79 produces an output pulse for N clock pulses if it is the enable mode for at least N clock periods. If N consecutive samples do not exhibit overload, AND gate 72 causes counter 79 to reprogram and restart counting when further consecutive samples exhibit overload. If N consecutive samples do exhibit overload so that counter 79 produces an output pulse, the output pulse is coupled via OR gate 80 to reset latch 75 and is coupled to latch 77 to load the output of ADDER 74 therein.

ADDER 74, having an input port 73 coupled to receive magnitude values from gate 32, and latch 75 having input and output ports respectively coupled to output and input ports of adder 74 form a digital integrator. The reset signals coupled to latch 75 preclude adder 74 from producing the sum of greater than N overload samples. Only when the sum of N overload samples is generated is the value stored in latch 77. The contents of latch 77 are coupled as dividend values to divider 78 which is conditioned by values from ROM 52 to divide the contents of latch 77 by the value N and, thus, to produce the average of the overload samples over N samples.

It will be appreciated by those skilled in the art of digital circuit design that the value necessary to program counter 79 to count N clock pulses may in fact not be the value N. Similarly if the divider 78 is, e.g. a shaft-and-add type scaling circuit, the value provided to divider 78 from ROM 52 may also be different from the value N.

In review, the circuit of FIG. 3 generates overload magnitude average samples only when N consecutive samples exhibit overload and counter 79 generates an output pulse each time a new overload magnitude average is produced.

Figure 4:
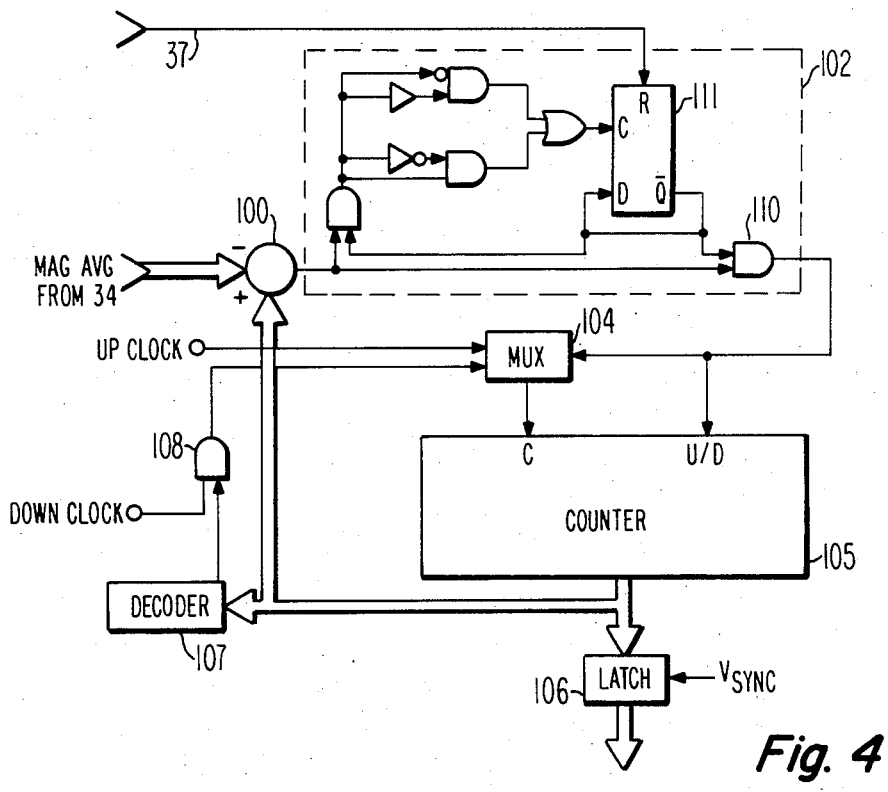
FIG. 4 is a logic diagram of a time constant generator for use in the FIG. 2 circuit.

FIG. 4 is an illustrative embodiment of the time constant generator 36 of FIG. 2. The output of the time constant generator is the count generated by up/down counter 105 which is stored in latch 106 at the end of a field/frame period by e.g. the vertical sync signal. The output of counter 105 is also applied to one input port of subtracter 100. The overload magnitude averages from element 34 are applied to the other input port of subtracter 100. If the overload magnitude average value exceeds the count in counter 105 the sign bit from subtracter 100 conditions the counter to count upward. Alternatively, if the overload value is less than the count in counter 105 the sign bit from subtracter 100 conditions counter 105 to count downward. Whether the counter is currently counting upward or downward, when the value of the counter becomes equal to the present overload value, the counter is conditioned to count downward at least until the next overload value is applied to subtractor 100.

The up count rate (e.g. $f_{sc}/164$) is faster than the down count rate (e.g. $f_{sc}/2460$) making the attack time of the counter faster than the decay time.

Over time the count provided by counter 105 is proportional to the number and magnitude of overload occurrences.

The operation of up/down counter 105 is controlled as follows. An up-clock signal and a down-clock signal are applied to respective signal input terminals of multiplexer 104. The output terminal of multiplexer 104 is coupled to the clock input terminal of counter 105. The up/down count control terminal (u/p) of the counter and the multiplexer control input terminal are connected to the output terminal of AND gate 110. AND gate 110 is normally conditioned to pass the sign bit from subtracter 100 to the multiplexer 104 and counter 105. A logic one from the output of AND gate 110 conditions counter 105 to the count up mode and conditions multiplexer 104 to couple the up-clock to counter 105. Conversely, a logic zero from the output terminal of AND gate 110 conditions counter 105 to the count down mode and conditions multiplexer 104 to couple the down-clock to counter 105.

The circuit 102 exclusive of AND gate 110 senses changes in the values of the sign bit from subtracter 100. When the sign bit changes from a logic one to a logic zero or vice versa, D flip-flop 11 disables AND gate 110 causing it to produce a logic zero at its output. Flip-flop 111 disables AND gate 110 and also renders circuit 102 insensitive to successive sign bit changes until flip-flop 111 is reset by a pulse on connection 37 which occurs when a new overload average is provided from element 34. At this time AND gate 110 is again conditioned to pass the sign bit from subtractor 100 to place counter 105 in the appropriate count mode.

If the choma samples applied to the input bus 20 are signed 8-bit samples, the sample magnitudes provided by element 34 will be 7-bit values. Counter 105 is, therefore, selected to produce a 7-bit output count. The count provided by counter 105 cannot exceed the maximum overload average from element 34. However, when AND gate 110 is disabled and counter 105 is conditioned to count downward it is possible to count to the minimum value which the counter can exhibit and beyond i.e. the output count will fold over to the maximum value and continue to count down from this value. To preclude this occurrence the counter 105 output count is applied to decoder 107 arranged to detect the occurrence of the minimum output count value. The output signal from decoder 107 controls AND gate 108 which couples the down-clock to multiplexer 104. When the minimum count is detected AND gate 108 is disabled so that the down-clock is decoupled from the counter thereby preventing the counter output from folding over.

What is claimed is:

1. In apparatus for processing a video signal including a chrominance signal component, chrominance signal overload detection apparatus comprising:
   a source of chrominance signal;
   means coupled to said source for detecting the magnitude of the chrominance signal;
   means for comparing the magnitudes of the chrominance signal against a predetermined magnitude value for generating a control signal for said chrominance magnitude exceeding said predetermined magnitude;
   means responsive to said control signal for coupling chrominance signal magnitudes exceeding said predetermined magnitude from said means for detecting the magnitude of the chrominance signal to a first output port;
   means coupled to said source, for detecting noise magnitudes and generating a further control signal, the value of which corresponds to the relative value of said noise; and
   means responsive to said further control signal and coupled to said first output port for averaging chrominance magnitudes occurring thereat over a period determined by said further control signal.

2. The apparatus set forth in claim 1 wherein the chrominance signal is in sampled data format and the means for averaging chrominance magnitudes comprises:
   means for detecting the occurrence of N consecutive chrominance magnitude samples having magnitudes exceeding said predetermined magnitude; and
   means for generating the average of said N consecutive chrominance magnitude samples where N is an integer determined by said further control signal 3. The apparatus set forth in claim 2 wherein said control signal consists of pulses occurring when said chrominance magnitudes exceed said predetermined magnitude and further includes:
   means including means responsive to said average chrominance magnitudes over N samples for generating a signal approximating the average value of said average chrominance samples over time and corresponding to the relative overload condition of said chrominance signal.

4. The apparatus set forth in claim 3 wherein the means for generating a signal corresponding to the relative overload condition of the chrominance signal further includes:

means responsive to said control signal for generating a count of the number of average chrominance magnitudes over N samples occurring over a predetermined interval; and means responsive to said count for scaling the approximate average value of said average chrominance samples over time.

5. The apparatus set forth in claim 3 wherein said means for generating a signal approximating the average value of said average chrominance magnitudes comprises:

an up/down counter for counting pulses applied to a clock input and having a count output port at which the current value of the count is available, said count value corresponding to said signal approximating the average value of said average chrominance magnitude samples over time;

a comparator having a first input port coupled to said means for averaging chrominance magnitudes and a second input port coupled to the count output of said counter for generating a bilevel control signal having a first state when the average chrominance magnitude exceeds said count value and a second state when said count value exceeds said average chrominance magnitude;

means for applying first and second clock signals corresponding to an up-clock signal and a down-clock signal respectively; and means responsive to said up-clock signal, said down-clock signal and said bilevel control signal for conditioning said up/down counter to incrementally count said up-clock signal when the count value is less than said average chrominance magnitude sample and to condition said up/down counter to decrementally count said down-clock signal when said count value exceeds said average chrominance magnitude samples.

6. The apparatus set forth in claim 1 wherein said video signal includes synchronizing components and said chrominance signal components includes intervals wherein video information is absent and said means for detecting noise comprises:

gating means coupled to said source and responsive to said synchronizing components for coupling said source to an output port thereof during intervals when said video information is absent;

signal integrating means coupled to the output port of said gating means for integrating signal when said source is coupled to the output port of said gating means; and means responsive to said signal integrating means for generating said further control signal, said further control signal corresponding to predetermined ranges of integrated signal from said integrating means.

7. A system for detecting overload conditions of a chrominance signal component of a video signal, comprising:

a source of said chrominance signals;

a source of a predetermined magnitude value;

means coupled to said source of chrominance signals and said source of predetermined magnitude values for detecting occurrences of said chrominance signals continuously exceeding said predetermined magnitude value for predetermined time intervals and producing average chrominance values corresponding to averages of said chrominance signals occurring during respective detected intervals;

means, coupled to said means for producing average chrominance values, for generating a chrominance overload control signal corresponding to an approximate time average of said average chrominance values.

8. The system set forth in claim 7 wherein said means for producing average chrominance values includes:

means coupled to said source for detecting the level of noise attendant said chrominance signals;

means, coupled to said means for detecting noise, and responsive to said noise level, for establishing said predetermined time interval.

9. The system set forth in claim 7 wherein said means for producing average chrominance values includes:

comparing means, coupled to said source of chrominance signals and said source of predetermined magnitude values, for generating a control signal when the magnitude of said chrominance signal exceeds said predetermined magnitude value;

means coupled to said comparing means and responsive to said control signal, for detecting occurrences of said chrominance signal continuously exceeding said predetermined magnitude value for said predetermined time interval; and means, coupled to said source of chrominance signals and said means for detecting, for generating the average value of the chrominance signal for each predetermined interval that said chrominance signal magnitude continuously exceeded said predetermined magnitudes.

10. The system set forth in claim 9 wherein said means for generating a chrominance overload control signal includes:

means responsive to said detecting means for developing a sum related to the number of occurrences of said average chrominance values over a predetermined video signal interval; and means responsive to said sum for weighting said chrominance overload control signal to reflect greater overload conditions for larger sums.

11. The system set forth in claim 9 wherein said means for producing average chrominance values includes:

means coupled to said source for detecting the level of noise attendant said chrominance signals;

means, coupled to said means for detecting noise, and responsive to said noise level, for establishing said predetermined time interval.

12. The system set forth in claim 8 wherein said video signal includes synchronizing components and said chrominance signal components includes intervals wherein video information is absent and said means for detecting noise comprises:

gating means coupled to said source and responsive to said synchronizing components for coupling said source to an output port thereof during intervals when said video information is absent;

signal integrating means coupled to the output port of said gating means for integrating signal when said source is coupled to the output port of said gating means; and means responsive to said integrating means for producing a noise level signal corresponding to the average noise level over said intervals.

13. The system set forth in claim 8 wherein said chrominance signal is in sampled data format and said means for producing average chrominance values include:

means for detecting the occurrence of N consecutive chrominance magnitude samples having magnitudes exceeding said predetermined magnitude; and means for generating the average of said N consecutive chrominance magnitude samples where N is an integer determined by said noise level.

14. The system set forth in claim 7 wherein the means for generating chrominance overload control values include:

means, responsive to said means for producing average chrominance values, for counting the occurrences of said average chrominance values in an image period; and means responsive to said count for weighting said approximate time average.

* * * * *